(12) United States Patent
Reyes, Jr. et al.

(10) Patent No.: US 12,331,663 B2
(45) Date of Patent: Jun. 17, 2025

(54) NUCLEAR REACTOR SYSTEM BASED INDIRECT HEAT CYCLE MANAGEMENT

(71) Applicant: NuScale Power, LLC, Corvallis, OR (US)

(72) Inventors: José N. Reyes, Jr., Corvallis, OR (US); John Swanson, Glen Allen, VA (US); Luis DePavia, Corvallis, OR (US); Francis Y. Tsang, Bellingham, WA (US); Zack Houghton, Salem, OR (US); Mustafa Aljabery, Eugene, OR (US)

(73) Assignee: NuScale Power, LLC, Corvallis, OR (US)

( * ) Notice: Subject to any disclaimer, the term of this patent is extended or adjusted under 35 U.S.C. 154(b) by 0 days.

(21) Appl. No.: 18/674,614

(22) Filed: May 24, 2024

(65) Prior Publication Data
US 2024/0392700 A1  Nov. 28, 2024

Related U.S. Application Data

(60) Provisional application No. 63/504,231, filed on May 25, 2023.

(51) Int. Cl.
*F01K 11/02* (2006.01)
*F01K 13/00* (2006.01)
*F01K 23/10* (2006.01)

(52) U.S. Cl.
CPC ............ *F01K 11/02* (2013.01); *F01K 13/006* (2013.01); *F01K 23/10* (2013.01)

(58) Field of Classification Search
CPC ......... F01K 11/02; F01K 13/006; F01K 23/10
See application file for complete search history.

(56) References Cited

U.S. PATENT DOCUMENTS

| | | | | |
|---|---|---|---|---|
| 3,047,479 | A | * | 7/1962 | Young ..................... G21D 5/08 976/DIG. 310 |
| 3,065,162 | A | * | 11/1962 | Hub ......................... F02C 9/24 60/660 |

(Continued)

FOREIGN PATENT DOCUMENTS

KR  101028634 B1  4/2011

OTHER PUBLICATIONS

International Search Report and Written Opinion for PCT Application No. PCT/US2024/031153, dated Sep. 12, 2024, 11 pages.

*Primary Examiner* — Shafiq Mian
(74) *Attorney, Agent, or Firm* — Lee & Hayes, P.C.

(57) ABSTRACT

An integrated system for indirect cycle steam heating comprising a nuclear power module configured to output first steam; a turbine generator configured to receive the first steam and output second steam; a heat exchanger configured to receive water, receive at least one of first steam, second steam, and transfer heat from the at least one of first steam and second steam into the water to create third steam a peaking heater configured to receive the third steam, transfer augmenting heat into the third steam, and heat, based at least in part on the transfer, the third steam to have a temperature above a threshold temperature an auxiliary heater configured to receive the third steam; and a chemical processing plant configured to receive the third steam and transfer heat from the third steam into a chemical.

20 Claims, 10 Drawing Sheets

(56) References Cited

U.S. PATENT DOCUMENTS

| | | | | |
|---|---|---|---|---|
| 3,848,416 A | * | 11/1974 | Bundy | G21D 1/02 |
| | | | | 60/644.1 |
| 3,998,695 A | * | 12/1976 | Cahn | F01K 3/06 |
| | | | | 60/659 |
| 4,343,682 A | * | 8/1982 | Grimes | G21D 5/08 |
| | | | | 376/214 |
| 7,970,094 B2 | * | 6/2011 | Kitou | G21D 3/00 |
| | | | | 376/241 |
| 2008/0137797 A1 | | 6/2008 | Peter | |
| 2009/0025387 A1 | | 1/2009 | Willson | |
| 2017/0098483 A1 | | 4/2017 | Zhan | |
| 2022/0112820 A1 | | 4/2022 | Huntington | |

* cited by examiner

600

```
┌─────────────────────────────────────────────┐
│ TRANSFER, FROM A TURBINE GENERATOR AND TO A HEAT │
│ EXCHANGER, FIRST STEAM AT A FIRST TEMPERATURE │
│ GENERATED UTILIZING INITIAL STEAM OUTPUT BY A SMALL │
│ MODULAR NUCLEAR REACTOR │
│ 602 │
└─────────────────────────────────────────────┘
                    │
                    ▼
┌─────────────────────────────────────────────┐
│ GENERATE, BY THE HEAT EXCHANGER, SECOND STEAM │
│ EMITTED FROM WATER BEING HEATED BY THE FIRST │
│ STEAM AND CONVERTED TO THE SECOND STEAM │
│ 604 │
└─────────────────────────────────────────────┘
                    │
                    ▼
┌─────────────────────────────────────────────┐
│ DIRECT, BY THE HEAT EXCHANGER, THE SECOND STEAM │
│ TO A PEAKING HEATER │
│ 606 │
└─────────────────────────────────────────────┘
                    │
                    ▼
┌─────────────────────────────────────────────┐
│ GENERATE, BY THE PEAKING HEATER, SECOND STEAM AT │
│ A SECOND TEMPERATURE │
│ 608 │
└─────────────────────────────────────────────┘
                    │
                    ▼
┌─────────────────────────────────────────────┐
│ DIRECT, BY THE PEAKING HEATER, THE SECOND STEAM │
│ AT THE SECOND TEMPERATURE TO AT LEAST ONE OF A │
│ CHEMICAL PROCESSING PLANT OR AN AUXILIARY HEATER │
│ 610 │
└─────────────────────────────────────────────┘
```

FIG. 6

NUCLEAR REACTOR SYSTEM BASED INDIRECT HEAT CYCLE MANAGEMENT

CROSS-REFERENCE TO RELATED APPLICATIONS

This application claims the benefit of U.S. Provisional Patent Application No. 63/504,231 filed on May 25, 2023 and titled "NUCLEAR REACTOR SYSTEMS INCLUDING INDIRECT CYCLE WITH INTERMEDIATE HEAT EXCHANGER, PROCESS HEAT RECOVERY, AND PEAKING HEAT," which is incorporated herein by reference in its entirety.

BACKGROUND

Petrochemical plants (i.e., facilities that process chemicals derived from Petroleum) rely on fuels and electricity to generate the high temperatures required for chemical production. While different types of petrochemical plants produce different products (e.g., ethylene plant, methanol plant, polyethylene plant, etc.), all petrochemical plants require large amounts of energy to produce petrochemicals (e.g., olefins (alkenes), aromatics, syngas, Methane, Methanol, etc.). In 2021, the chemical industry consumed about 37% of all energy consumed by the manufacturing industry in the United States. Industrial heat demand by Petroleum refining and chemicals manufacturing account for 56% of the process heating fuel consumption (2018). The U.S. chemical industry generates more than $486B USD and is responsible for 25% of the total U.S. GDP (2022). The energy source for these large petrochemical plants typically comes from direct burning of fossil fuels or from electricity generated using fossil fuels. As part of their commitment to significantly reduce Carbon Dioxide emissions, the petrochemical industry, among others, is seeking reliable commercial scale, Carbon-free, electricity and process heat. Small Modular Reactors (SMR) can play a major role in petrochemical companies meeting their publicly stated Carbon-free or Carbon-neutral mandates.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 6 illustrates a flowchart describing an example process for indirectly transferring heat from a small modular nuclear reactor (SMR) to a chemical processing plant and/or auxiliary heater.

DETAILED DESCRIPTION

Overview

Figure 1:
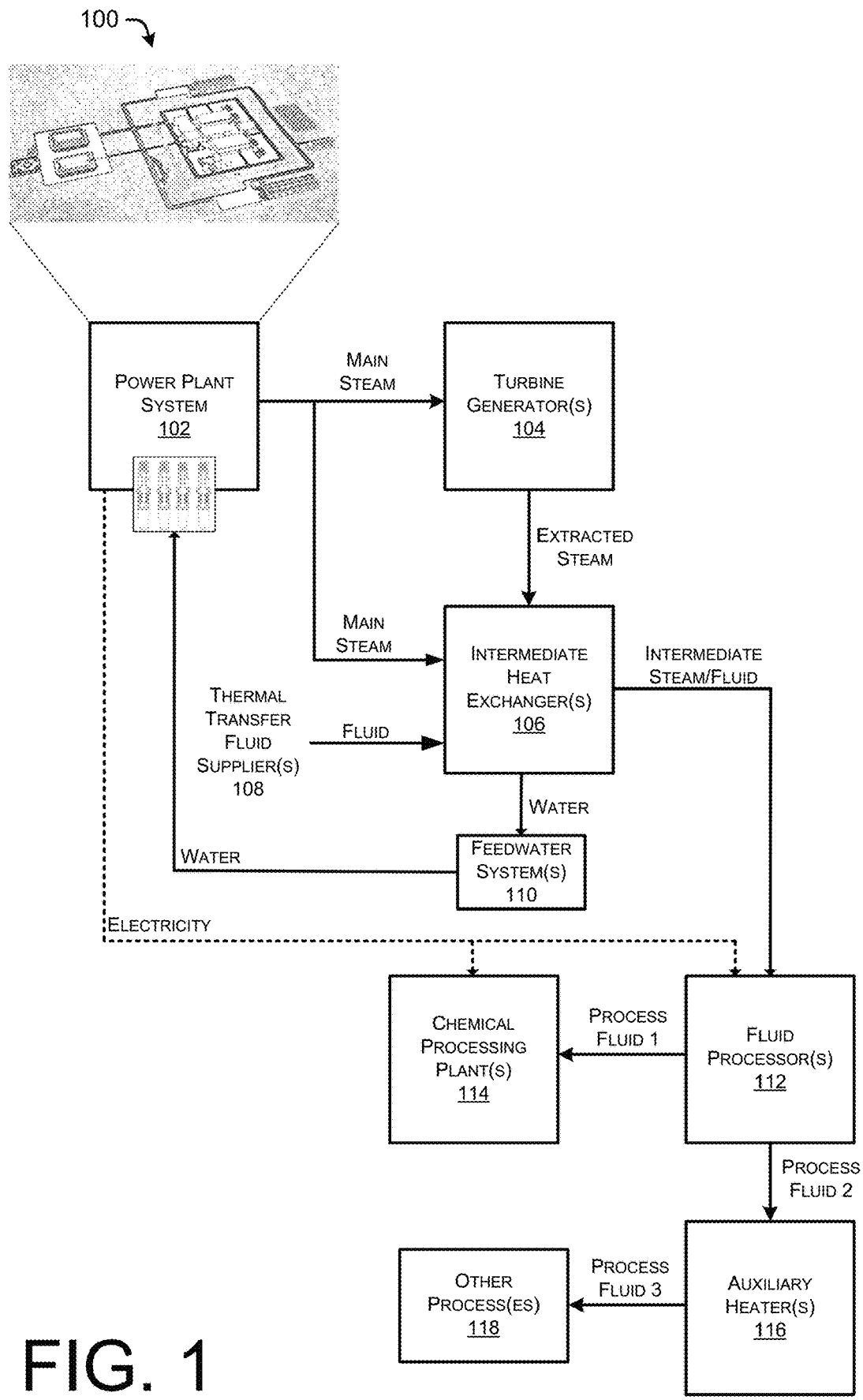
FIG. 1 schematically illustrates an indirect cycle steam heating system that includes a Small Modular Nuclear Reactor (SMR) system integrated with a chemical production system.

This disclosure is directed to an indirect cycle that utilizes an intermediate heat exchanger to transfer heat from an SMR plant to an industrial user of heat. The Nuclear Regulatory Commission requires that the land area within a 10-mile radius of a Nuclear Power Plant be maintained as an Emergency Planning Zone (EPZ). This requires regular emergency planning exercises with local law enforcement, fire departments, federal, state and local authorities. It also requires planning evacuation routes, placement and testing of sirens to notify the public, and the ability to dispense potassium iodide tablets as needed to assure thyroid protection in the event of an accident. Because of their new level of safety, some Small Modular Reactors are able meet the 10-mile regulatory dose limits at much shorter distances. In some embodiments, the 10-mile regulatory dose limits would not be exceeded 400 feet from the turbine building, well within the SMR plant site boundary. In some embodiments, the indirect cycle may serve as a tertiary loop which creates two independent boundaries between the fluid inside the reactor and the process steam. This may reduce or even eliminate regulatory and operational considerations associated with direct cycle steam heating by using one or more intermediate heat exchangers The intermediate heat exchanger(s), peaking heater(s), and the process heat recovery recuperative heat exchanger(s) may be used in conjunction with an EPZ that extends to the perimeter of the SMR site.

In these embodiments, one or more SMR plant site EPZs for the systems described herein may be in closer proximity to the recipient site (e.g., a petrochemical plant, etc.) than operational regulations may allow for typical nuclear reactor plants (e.g., less than ten miles) operating with conventional technology. The SMR plant site EPZ operating according to the techniques discussed herein and having regulatory approval to operate in close proximity to a recipient's site while maintaining clearly defined operational boundaries (i.e., maintain a small threshold distance) between the SMR plant site EPZ(s) and the recipient's site, may provide numerous advantages. For example, the advantages may include heat augmentation of a heat transfer fluid at the point of use and a compressor at the recipient site. Additional benefits may include reduced material cost, increased heat transfer efficiency, and increased safety environments. Because petrochemical plants (i.e., facilities that process chemicals derived from Petroleum) rely on fuels and electricity to generate the high temperatures required for chemical production, the embodiments of an indirect steam cycle described herein will allow for the continuous supply of Carbon-free energy necessary for the large-scale production of petrochemicals (e.g., olefins (alkenes), aromatics, syngas, Methane, Methanol, etc.).

Specifically, heat from SMR steam may be transferred to an intermediate heat exchanger containing a working fluid with the appropriate chemistry and pressure needed to generate process heat. In some embodiments, using an independent high-pressure loop (e.g., steam loop 200B/300B/500B, steam loop 200C/300C/500C, oil loop 400B, oil loop 400C, etc.) will allow for the continuous supply of fluid (e.g., liquid, gas, etc.) at high pressures and/or temperatures.

A steam heating system may contain several loops for transferring and processing heat. In an example embodiment, the first steam loop may include a small modular nuclear reactor, a turbine generator, a condenser, and/or a feedwater system. In an embodiment, this first steam loop may also be called a "Main Steam" system. In the main steam system, high pressure and high temperature steam may be produced by a small modular nuclear reactor. The main steam may be directed to one or more steam turbines. The turbine may convert much of the energy within the main steam into rotational mechanical energy, which may drive a generator. Electricity generated by the turbine generator, may be used in a number of ways, including powering one or more components of the steam heating system (or one or more components of a different steam heating system), providing energy to an electrical power grid, and/or storing electrical energy (e.g., battery charging). Once the turbine has utilized the main steam energy, the turbine may output the used main steam as exhaust steam. In the embodiment, the exhaust steam may be a steam/vapor mixture.

Following the example embodiment, the exhaust steam may be directed to a condenser. The condenser may be a shell and tube type heat exchanger configured to direct the exhaust steam across heat transfer tubes that may have heat transfer fluid passing through them. The condenser may transfer the heat from the exhaust steam into the heat transfer fluid, which may condense the steam and cause the steam to be converted into a liquid (e.g., an output temperature and output pressure liquid). For example, the liquid, into which the steam in the condenser is converted, may include a low temperature and low-pressure liquid. The low temperature and low-pressure liquid may have a temperature and/or pressure below a threshold temperature and/or threshold pressure, respectively. In an embodiment, the output temperature and output pressure liquid may be part of the feedwater system. The feedwater system may include a pump and a valve to regulate a steady supply of feedwater into the SMR. The SMR may be configured to utilize the feedwater to generate high pressure and high temperature steam.

The steam heating system may include a second steam loop that includes the turbine, the generator, a heat exchanger, and/or the feedwater system. The turbine may direct (e.g., divert), as diverted steam, a portion of the main steam to a separate heat exchanger. In an embodiment, the diverted steam may be referred to as "extracted steam." In an embodiment, the extracted steam may be directed to a shell and tube type heat exchanger that causes the extracted steam to pass over heat transfer tubes (or "thermal transfer tubes") that have a heat transfer fluid (or "thermal transfer fluid") passing through them. It is understood that the heat transfer fluid may be one of many types of fluid (e.g., liquid water, oil, gas, etc.). In the embodiment, the heat exchanger may be configured to transfer heat from the extracted steam into the heat transfer fluid. In an embodiment, the heat transfer fluid may receive enough heat to change phase (i.e., liquid water may be converted to steam). In an embodiment, the heat transfer fluid may receive heat from the extracted steam and increase temperature (i.e., oil may enter the heat exchanger tubes at a first temperature and exit the heat exchanger tubes at a second temperature that is higher than the first temperature).

Once the extracted steam has transferred its heat to the heat transfer tubes, the steam may condense onto the tubes resulting in the production of liquid water. The liquid water may be redirected to the feedwater system from the first loop and fed back into the small modular nuclear reactor to produce main steam.

The steam heating may also include a third independent loop. The third loop may include the heat exchanger, a heating augmentation device, and/or additional heat recovery. The third loop may also include integration connection points to one or more connections with the first or second loops.

In an embodiment, after receiving the heat from the extracted steam, the heat transfer fluid may be directed to a heating augmentation device (e.g., a compressor, a peaking heater, etc.). The heating augmentation device may be configured to receive the heat transfer fluid at a first temperature and output the heat transfer fluid at a second temperature that is greater than the first temperature. In an embodiment, the heating augmentation device may direct the fluid at the second temperature to another device or system for additional heat recovery. For example, the heated heat transfer fluid may be directed to an auxiliary heater to receive additional heat in anticipation for additional heat recovery. In an embodiment, the heated heat transfer fluid may be directed to a chemical processing system used in petrochemical manufacturing (e.g., thermal cracking of alkanes and alkenes, heavy oil conversions to light oil, dissolution of heavy oil to produce gasoline additives, etc.) or other processes (e.g., bulk plastic waste recycling, light plastics for regeneration of syngas, etc.).

In an embodiment, the heating augmentation device (e.g., peaking heater, compressor, etc.) may augment the temperature and pressure of the fluid entering the augmentation device such that supercritical fluid is discharged from the augmentation device. Supercritical fluid, as used herein, is defined as a fluid at a temperature and pressure above the critical point for the fluid, where liquid and gas phases of a fluid do not exist. The temperature and pressure are below the pressure required to compress the fluid into a solid.

By utilizing various loops and/or the present technology, an indirect cycle may be employed with an intermediate heat exchanger, a heat recovery processor, and a peaking heater. In some aspects of the present technology, the indirect cycle can reduce or even eliminate the regulatory and operational considerations and/or limitations associated with direct cycle steam heating according to conventional technology. For example, in contrast to existing systems that utilize direct cycle steam heating, the systems according to the technology discussed herein may use an intermediate heat exchanger, peaking heaters, and a process heat recovery recuperative heat exchanger to customize output steam temperature and/or pressure. In this case, heat from the SMR steam can be transferred to an independent high-pressure loop containing a working fluid with the appropriate chemistry and pressure needed to generate process heat. The independent loop also can reduce or eliminate concerns regarding primary steam leaks, which, in existing systems, could potentially contaminate process steam. In contrast to existing systems, feedwater replacement for the SMRs is not needed.

In some embodiments, one or more compressors, one or more heat exchangers, and/or one or more heaters may work in conjunction to provide higher steam production system reliability and the ability to provide a wide range of steam pressures, steam mass flowrates, and steam temperatures. In some embodiments, the compressor(s), heater(s), valve(s), piping, and associated steam and liquid control systems may include a Process Steam Conditioning and Control (PSCC) system housed in a PSCC building. In some embodiments, the PSCC system may provide a centralized control interface between the nuclear plant and the industrial user of process steam.

Illustrative Embodiments

FIG. 1 schematically illustrates an indirect cycle steam heating system 100 that includes a Small Modular Nuclear Reactor (SMR) system integrated with a chemical production system. The energy system 100 may include a power plant system 102, with one or more turbine generators 104, one or more intermediate heat exchangers 106, one or more heat transfer fluid suppliers 108, one or more feedwater systems 110, one or more fluid processors 112, one or more chemical processing plants 114, one or more auxiliary heaters 116, and other process(es) 118 (e.g., bulk plastic waste recycling, light plastics for regeneration of syngas, etc.).

In the illustrated embodiment, the power plant system 102 can be configured for use in one or more industrial processes/operations and, more particularly, for use in resource production/recovery operations. The power plant system 102 can be located at or near the location of the chemical processing plant 114. For example, the power plant system 102 can be a permanent or temporary installation built at or near (e.g., roughly 1 km from) the location of the chemical processing plant 114 or can be a mobile or partially mobile system that is moved to and assembled at or near (e.g., within a threshold distance from) the location of the chemical processing plant 114. For example, the power plant system 102 can be moved to and assembled at or near any other portions of the indirect cycle steam heating system 100.

In an embodiment, the power plant system 102 may include an SMR system (e.g., multi-module power plant design). However, in various instances, the power plant system 102 may represent any type of power plant system including any of various other types of nuclear reactors and/or nuclear reactor systems. For example, the power plant system 102 may include multiple small modular reactors.

The power plant system 102 may be operably coupled to the turbine generator(s) 104, the intermediate heat exchanger(s) 106, a heat transfer fluid supplier(s) 108, a feedwater system(s) 110, a fluid processor(s) 112, a chemical processing plant(s) 114, and an auxiliary heater(s) 116. Similarly, individual ones of steam output paths of the power plant system 102 can be fluidly coupled to the turbine generator(s) 104 and/or the intermediate heat exchanger(s) 106. The power plant system 102 may selectively provide steam (or "main steam") to be fluidly coupled to the turbine generator(s) 104 and/or the intermediate heat exchanger(s) 106. The steam generated by the power plant system 102 may have a predetermined temperature (e.g., 475° F.) and/or a predetermined pressure (e.g., 400 psig). In other embodiments, the power plant system 102 can be operably coupled to additional or fewer outputs and/or the various outputs can receive electricity and/or steam from other sources (e.g., additional heat exchanger, electricity sources, etc.).

It is noted that the turbine generator(s) 104 may include a combination of a steam turbine with a generator. In an embodiment, the steam turbine portion of the turbine generator(s) 104 may be used to extract thermal energy from pressurized main steam and convert it to rotational energy of a shaft. In an embodiment, the turbine generators(s) 104 may include one or more various types of steam turbine (e.g., impulse, reaction, etc.) that may utilize various directions of steam flow (e.g., tangential flow, radial flow, axial flow, mixed flow, etc.). In an embodiment, the turbine generator 104 may receive steam from the power plant 102, including from one or more small modular reactors.

In an embodiment, the turbine generator(s) 104 may direct high temperature and high-pressure steam to the intermediate heat exchanger(s) 106. For example, the steam (or "extracted steam") delivered from the turbine generator(s) 104 to the intermediate heat exchanger(s) 106 may have a temperature above a threshold temperature (e.g., 475° F.) and/or a pressure above a threshold pressure (e.g., 400 psig). In an embodiment, the intermediate heat exchanger(s) 106 may be configured to receive main steam (e.g., high-pressure and high temperature steam). The steam ("extracted steam" or "main steam") received by the intermediate heat exchanger(s) 106 may be directed across heat transfer tubes with a heat transfer fluid through the tubes. In an embodiment, the heat transfer tubes may be configured to allow heat to transfer from the steam into a heat transfer fluid that is provided by the heat transfer fluid supplier(s) 108 (e.g., pump if a liquid is used as the heat transfer fluid, a compressor if a gas is used as the heat transfer fluid, etc.). In an embodiment which uses liquid water as the heat transfer fluid, the transferred heat boils the water to produce steam that may be subsequently condensed into a liquid condensate. In an embodiment, the condensate may be directed to the feedwater system(s) 110.

It is understood that the heat transfer fluid may be water, oil, or other useful substance. It is also understood that, based on the particular heat transfer fluid being used, the heat transfer fluid may change phase. For example, in an embodiment using water as the heat transfer fluid, water may be supplied to the intermediate heat exchanger(s) 106 and the heat transfer may result in the intermediate heat exchanger(s) 106 discharging steam. However, in an embodiment using oil as the heat transfer fluid, oil at a first temperature may be supplied to the intermediate heat exchanger(s) 106 and oil at a second temperature that is higher than the first temperature may be discharged from the intermediate heat exchanger 106.

In an embodiment, heat transfer fluid being discharged from the heat exchanger may be directed to a fluid processor(s) 112. In an embodiment, the fluid processor(s) 112, such as a peaking heater, a compressor, etc., or any combination thereof, may utilize electricity provided by the power plant system 102 to augment the heat within the heat transfer fluid received. In some examples, the fluid being supplied to the fluid processor(s) 112 (or "intermediate steam") may be at a predetermined temperature (or "first temperature") and the fluid processor(s) 112 may provide augmenting heat to the fluid (or "intermediate steam") to bring the fluid to a predetermined temperature (or "second temperature") or generate a second fluid (or "process fluid 1"). In those or other examples, the fluid being supplied to the fluid processor(s) 112 (or "intermediate steam") may be at a predetermined temperature (or "second temperature") and the fluid processor(s) 112 may provide augmenting heat to the fluid (or "intermediate steam") to bring the fluid to a predetermined temperature (or "third temperature") or generate a third fluid (or "process fluid 2). The temperature of the fluid supplied to the fluid processor(s) 112 may be lower than the temperature of the fluid (e.g., steam, liquid, etc.) output by the fluid processor(s) 112. It is understood that the temperature of the fluid output by the fluid processor(s) 112 may be a specified temperature required for future heat recovery.

In an embodiment, the heat transfer fluid may be directed to one or more heat recovery processes. In an embodiment, the process fluid 1 being at a required temperature may be directed to a chemical processing plant(s) 114. In an embodiment, the chemical processing plant(s) 114 may be a process necessary for petrochemical production (e.g., thermal cracking of alkanes and alkenes, heavy oil conversions to light oil, dissolution of heavy oil to produce gasoline additives, etc.).

In an embodiment, the fluid may require additional heat to aid with other processes. In such an embodiment, the process fluid 1 may be directed to the chemical processing plant(s) 114. Alternatively, or additionally, the process fluid 2 may be directed to the auxiliary heater(s) 116.

In some examples, the process fluid 1 may be at a temperature and/or pressure useful for the chemical processing plant(s) 114. But additional heat may be required for other processes (e.g., bulk plastic waste recycling, light plastics for regeneration of syngas, etc.). For instance, the process fluid 1 output by the fluid processor(s) 112 and to the chemical processing plant(s) 114 may have a temperature above a threshold temperature (e.g., 500° C./932° F.) and/or a pressure above a threshold pressure (e.g., 1000 psig).

In those or other examples, the process fluid 2 may be at a temperature and/or pressure useful for the auxiliary heater(s) 116. For instance, the process fluid 2 output by the fluid processor(s) 112 and to the auxiliary heater(s) 116 may have a temperature below a threshold temperature (e.g., 600° C./1112° F.) and/or a pressure below a threshold pressure (e.g., 1000 psig). In such embodiments, the process fluid 2 may be directed to the auxiliary heater(s) 116. In an embodiment, the auxiliary heater(s) 116 may be configured to utilize electricity from the power plant system 102 to augment the heat transfer fluid heat with additional heat to a new and increased temperature. For instance, fluid output by the auxiliary heater(s) 116 may have a temperature above a threshold temperature (e.g., 600° C./1112° F.) and/or a pressure above below a threshold pressure (e.g., 1000 psig). In various cases, the fluid output by the auxiliary heater(s) 116 may be utilized by the other process(es) 118 (e.g., bulk plastic waste recycling, light plastics for regeneration of syngas, etc.). It is understood that one or more fluid processor(s) 112 and/or one or more auxiliary heater(s) 116 may be combined to produce a process fluid 3 at a temperature and/or pressure useful for the other process(es) 118.

In various examples, the power plant system 102 may be utilized to provide steam to various types of plants, such as a petrochemical plant. In those or other examples, the petrochemical plant can include the peaking heater and/or the auxiliary heater.

For the sake of clarity and simplicity of explanation only, any indirect steam cycle (e.g., individual ones of indirect steam cycles 200, 300, 400, and 500, as discussed below with reference to FIGS. 2-5)) is described herein as having one or more steam loops. It is understood that the steam loops described herein are only for explanatory purposes that and that the steam loops described may be combined into one or more loops. In some examples, the steam loops may include any number of steam loops.

Figure 2:
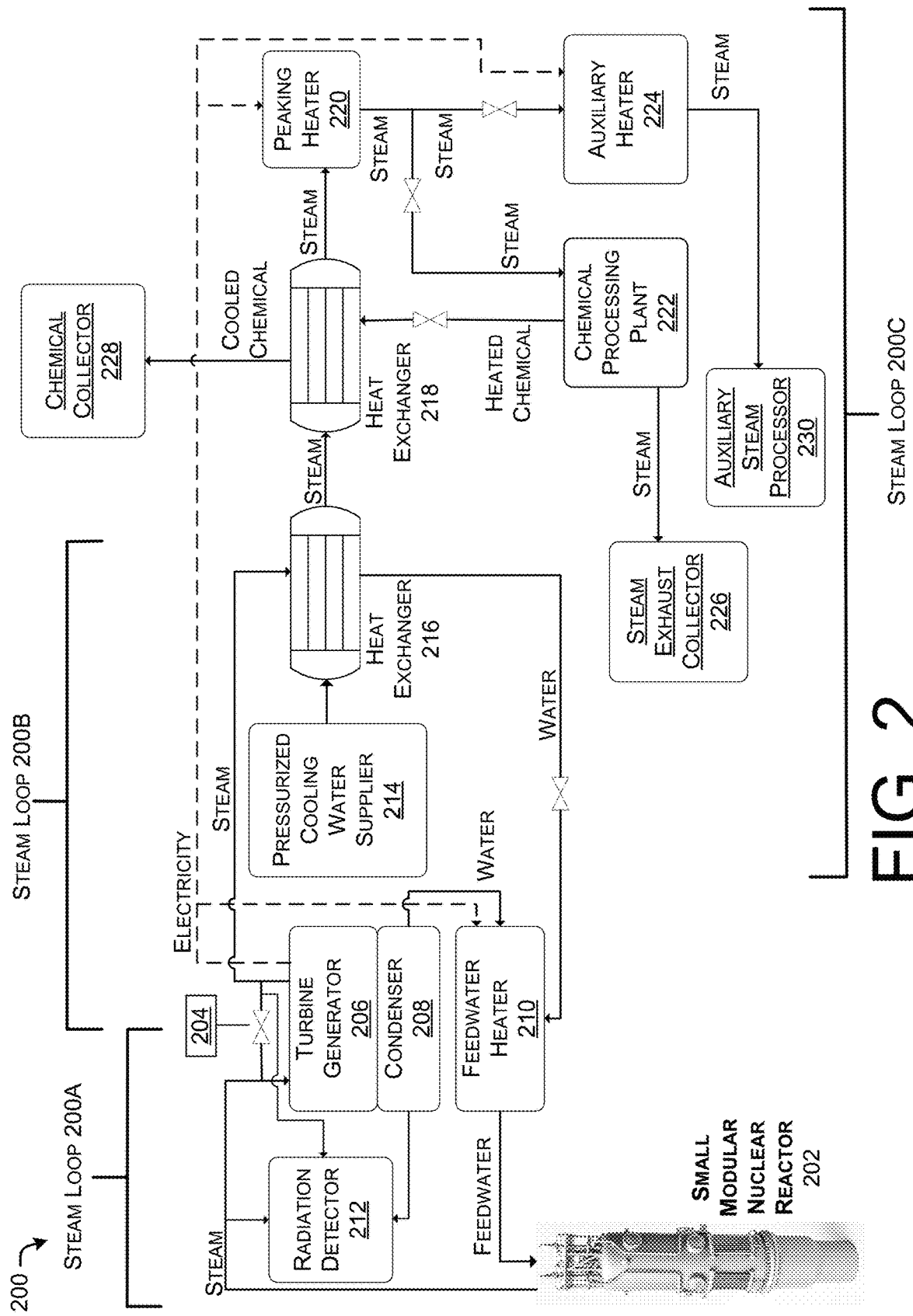
FIG. 2 schematically illustrates an indirect steam cycle receiving steam from a Small Modular Nuclear Reactor (SMR) and utilizing water as a heat transfer fluid for two heat exchangers.

FIG. 2 schematically illustrates an indirect steam cycle 200 utilizing water as a heat transfer fluid for two heat exchangers receiving steam from a Small Modular Nuclear Reactor (SMR). The order in which the operations or steps are described is not intended to be construed as a limitation, and any number of the described operations or steps may be combined in any order and/or in parallel to implement the indirect steam cycle 200.

In an embodiment, the indirect steam cycle 200 may include a first steam loop 200A, a second steam loop 200B, and a third steam loop 200C. In an embodiment, the first steam loop 200A may include an SMR 202, a turbine bypass 204, a turbine generator 206, a condenser 208, a feedwater heater 210, and a radiation detector 212. In an embodiment, the second loop 200B may include the turbine bypass 204, the turbine generator 206, the heat exchanger 216, and a feedwater heater 210.

In an embodiment, some components from the first steam loop (or "first loop") are also part of the second steam loop (or "second loop"), and/or vice versa. For example, the turbine bypass 204, the turbine generator 206, the condenser 208, and the feedwater heater 210 may be part of the first steam loop and/or the second steam loop. In an embodiment, the third steam loop (or "third loop") 200C may include a pressurized cooling water supplier 214, the heat exchanger 216, a heat exchanger 218, a peaking heater 220, a chemical processing plant 222, an auxiliary heater 224, a steam exhaust collector 226, a chemical collector 228, and an auxiliary steam processor 230. In various examples, one or more heat exchangers, such as the heat exchanger 216, the heat exchanger 218, one or more other heat exchangers, or any combination thereof, may be utilized to implement the intermediate heat exchangers 106, as discussed above with reference to FIG. 1. In an embodiment, the heat exchanger 216 may be part of the second steam loop and the third steam loop. In an embodiment, the SMR as discussed with reference to FIG. 2 may be the same as or similar to the SMR that is part of, and/or may be utilized to implement, the power plant system 102 as discussed above with reference to FIG. 1. Alternatively, or additionally, the turbine generator 206 may be utilized to provide electricity to the peaking heater 220 and the auxiliary heater 224.

In an embodiment, the first steam loop 200A may transfer heat from SMR 202 to feedwater to generate steam that may be used by the turbine generator before being condensed into water at a lower temperature to be directed to the feedwater heater 210. In an embodiment, the SMR 202 may generate heat and transfer the heat to feedwater. The feedwater may receive enough heat from the SMR 202 to be converted to steam. The steam may then be directed to turbine generator 206. The turbine generator 206 may be configured to utilize the high pressure and high temperature steam to generate electricity. Once the steam passes through turbine generator 206, it may be directed to condenser 208. Condenser 208 may be include heat transfer tubes configured to condense the steam into liquid condensate. The liquid condensate may then be directed to a feedwater system. It is understood that liquid condensate may be feedwater.

In an embodiment, SMR 202 may be configured to receive feedwater, transfer heat into the feedwater, and convert the feedwater into high pressure and high temperature steam. In an embodiment, when liquid condensate is generated from steam that passed through turbine generator 206, the liquid condensate may be a low pressure and low temperature liquid. For example, the low pressure and low temperature liquid may include a liquid with relatively lower pressure and/or relatively lower temperature, respectively, than that of the liquid (e.g., feedwater) supplied to the SMR 202. In an embodiment, the liquid condensate (feedwater) supplied by the condensed turbine generator 206 steam may be directed to a feedwater heater 210. The feedwater heater 210 may utilize electricity to preheat feedwater before it is directed to SMR 202.

In an embodiment, turbine bypass 204 may be configured to divert a portion of the high pressure and high temperature steam produced by SMR 202 directly to heat exchanger 216. It is understood that turbine bypass 204 may be a valve (e.g., throttle valve, globe valve, pneumatically operated, electrically operated, etc.) configured to permit steam to bypass turbine generator 206 and direct the steam to heat exchanger 216 as desired.

In an embodiment, steam loop 200A may include one or more monitoring locations. In an embodiment, a monitoring location may divert a portion of steam to radiation detector 212 that is configured to detect radiation and/or radioactive material (e.g., alpha, beta, gamma, neutron, contaminated material, etc.). In an embodiment, the radiation detector 212 may be a self-contained detection device (e.g., radiac meter, Geiger counter, etc.) or part of a radiation monitoring system.

In an embodiment, pressurized cooling water supplier 214 may be configured to provide pressurized water to the tube portion of heat exchanger 216. It is understood that pressurized cooling water supplier 214 may be a pump (e.g., centrifugal, positive displacement, etc.) or a pressurized water supply (i.e., a pressurized tank filled with temperature and/or chemistry-controlled water, etc.) configured to pressurize cooling water through one or more pipes such that the steam produced by heat exchanger 216 will be at a specific pressure.

In an embodiment, the second steam loop 200B may transfer first steam from turbine generator 206 at a first temperature to heat exchanger 216 where the first steam may be condensed into feedwater at a second temperature and directed to feedwater heater 210. In an embodiment, turbine generator 206 or turbine bypass 204 may direct high pressure and high temperature steam (e.g., first steam, etc.) to heat exchanger 216. In an embodiment, the high temperature and high-pressure steam may be directed onto heat transfer tubes that have a heat transfer fluid (e.g., pressurized cooling water, etc.) flowing through them within heat exchanger 216 at a third temperature. In an embodiment, heat from the first steam may be transferred into the heat transfer fluid causing the first steam to condense and be converted to a low temperature liquid used as feedwater at a fourth temperature. The feedwater may be directed to the feedwater heater for future use by steam loop 200A.

In an embodiment, the third steam loop 200C may transfer heat from high pressure and high-temperature steam (or "first steam") into pressurized cooling water in heat exchanger 216 to convert the pressurized cooling water into process steam (or "second steam"). The process steam may be directed into heat transfer tubes within heat exchanger 218. Inside heat exchanger 218, the process steam (or "second steam") may receive other heat from a chemical produced by chemical processing plant 222. The process steam may exit heat exchanger 218 at a higher temperature than when it entered heat exchanger 218. The process steam exiting heat exchanger 218 (or "altered second steam") may be directed to peaking heater 220. Peaking heater 220 may utilize electricity to transfer augmenting heat (i.e., additional supplemental heat to supplement the existing heat) to the process steam. It is understood that peaking heater 220 may be configured to provide variable amounts of augmenting heat in order to bring the process steam to a specified temperature (i.e., temperatures necessary for a particular petrochemical production process, etc.).

In an embodiment, peaking heater 220 may direct the process steam to chemical processing plant 222 or auxiliary heater 224. In an embodiment, chemical processing plant 222 may utilize the process steam to produce a chemical (i.e., through thermal cracking of alkanes and alkenes, heavy oil conversions to light oil, dissolution of heavy oil to produce gasoline additives, etc.). In an embodiment, the produced chemical may contain excess heat and the heated chemical may be directed to heat exchanger 218 to transfer heat from the heated chemical to the steam passing through the heat transfer tubes to become a cooled chemical. In an embodiment, the resulting cooled chemical may be directed to chemical collector 228. It is understood that chemical collector 228 may be a permanent or temporary system used for chemical storage, chemical delivery, and/or chemical transportation.

In an embodiment, chemical processing plant 222 may exhaust the used steam to steam exhaust collector 226 for future use. It is understood that steam exhaust collector 226 may include a connection to an auxiliary system, a connection point to another steam loop, a heat exchanger, or a thermal storage device, etc.

In an embodiment, peaking heater 220 may utilize electricity to provide augmenting heat to the process steam in preparation for additional processing (e.g., bulk plastic waste recycling, light plastics for regeneration of syngas, etc.). In an embodiment, auxiliary heater 224 may change (e.g., raise) the temperature of the processing steam to a specified temperature (i.e., a temperature necessary for bulk plastic waste recycling, light plastics for regeneration of syngas, etc.). In an embodiment, after increasing the temperature of the process steam, auxiliary heater 224 may direct the process steam to auxiliary steam processor 230. It is understood that auxiliary steam processor 230 may include any process and or system that requires the use of steam (e.g., bulk plastic waste recycling, light plastics for regeneration of syngas, thermal storage, etc.).

In a hypothetical example, feedwater is provided to SMR 202, which produces steam that is directed to turbine generator 206. The steam is then directed to heat exchangers 216 and 218 via the turbine bypass 204 or via the turbine generator 206. Heat exchangers 216 and 218 utilize the steam to generate process steam and direct the process steam to peaking heater 220. Peaking heater 220 augments the heat within the process steam and directs the augmented process steam to chemical processing plant 222 and/or an auxiliary heater 224. SMR 202 may be located within a perimeter (e.g., a nuclear emergency planning zone) of, and/or a predetermined distance from, chemical processing plant 222 and/or auxiliary heater 224. The predetermined distance may be less than a threshold distance. SMR 202 may represent one or more SMRs, which may provide the steam.

The number of SMRs may be selected according to the steam requirements and/or demands of one or more recipients (e.g., chemical processing plant 222 and/or the auxiliary heater 224) of the steam.

In the hypothetical example, and in contrast to relatively expensive and wasteful processing employed by existing systems, SMR 202 and heat exchangers 216 and 218 utilizing the techniques discussed herein to continuously supply industrial volumes of the steam to the recipients(s) may provide steam economically, efficiently, convertibly, and flexibly to the recipient(s) at a specific (e.g., customized, predetermined, specified, produced, desired, etc.) temperature and/or pressure.

Figure 3:
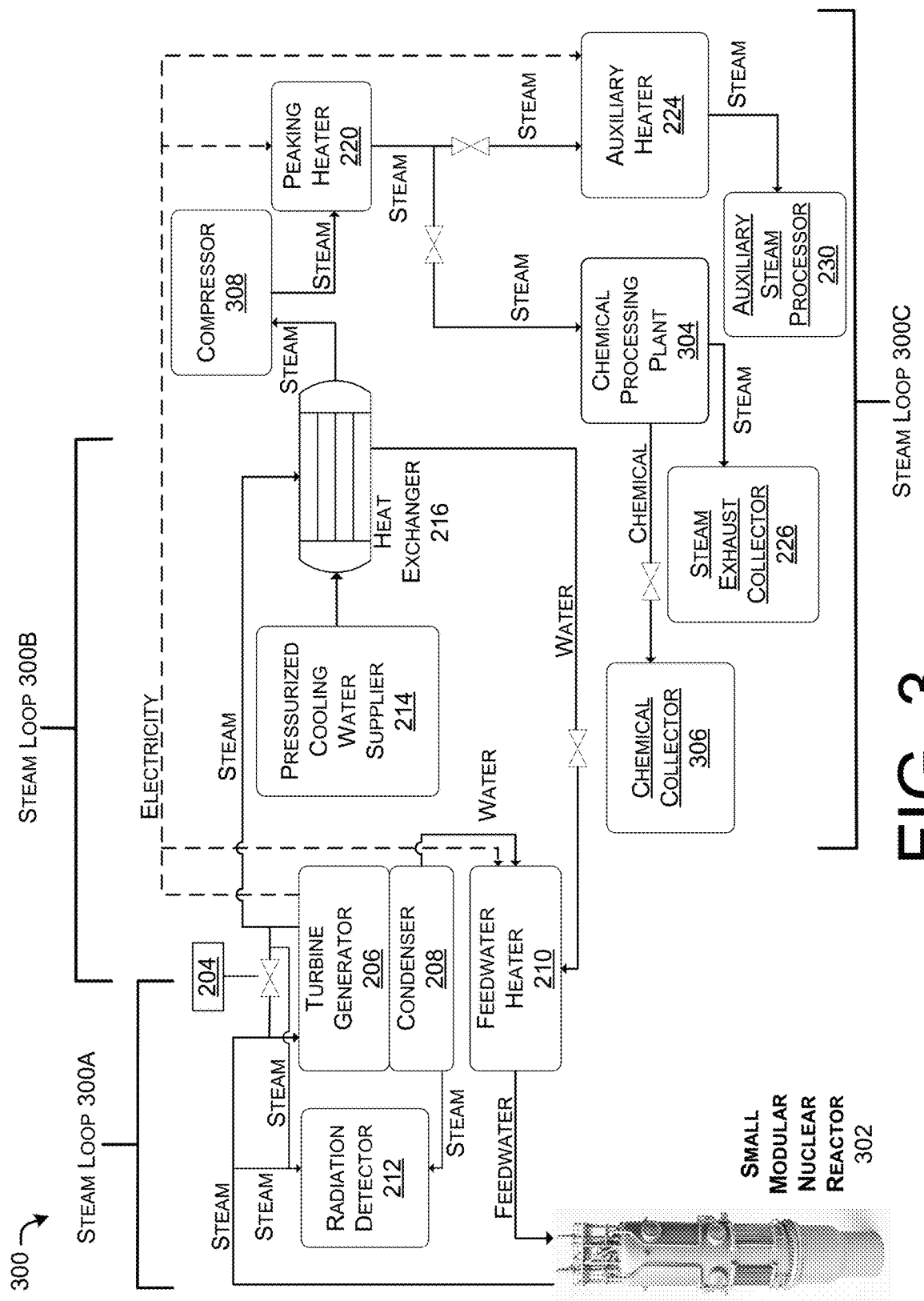
FIG. 3 schematically illustrates an indirect steam cycle receiving steam from a Small Modular Nuclear Reactor (SMR) and utilizing water as a heat transfer fluid for one heat exchanger.

FIG. 3 schematically illustrates an indirect steam cycle 300 utilizing water as a heat transfer fluid for one heat exchanger. Steam loop 300A, steam loop 300B, and steam loop 300C may include devices similar to those devices described above regarding steam loop 200A, steam loop 200B, and steam loop 200C, and discussed above with reference to FIG. 2.

In an embodiment, steam loop 300C may include chemical processing plant 304, chemical collector 306, and compressor 308. In an embodiment, chemical processing plant 304 may be similar to chemical processing plant 222, as described above with reference to FIG. 2. In an embodiment, chemical processing plant 304 may be a different process (i.e., a different process necessary for petrochemical production, or a process unrelated to petrochemical production, etc.) from the process of chemical processing plant 222.

In an embodiment, chemical collector 306 may be similar to or different from the chemical collector 228, as discussed above with reference to FIG. 2. It is understood that the configuration and operation of chemical collector 306 will depend on the chemical produced by chemical processing plant 304.

In an embodiment, compressor 308 may be configured to receive steam at a first pressure and discharge steam at a higher pressure. Although FIG. 3 depicts indirect steam cycle 300 as having a single compressor and a single peaking heater, it is understood that multiple compressors and/or peaking heaters may be used to produce steam at the desired pressure and temperature.

In an embodiment, indirect steam cycle 300 may operate similarly to indirect steam cycle 200 as discussed above regarding FIG. 2, however indirect steam cycle 300 may transfer heat from SMR 302 to a recipient (e.g., chemical processing plant 304, auxiliary heater 224, etc.) through a single heat exchanger (e.g., heat exchanger 216). By utilizing a single heat exchanger, indirect steam cycle 300 may avoid transferring heat from a produced chemical. For example, a chemical produced by the chemical processing plant 304 may be directed to chemical collector 306 while minimizing heat loss. Additionally, in an embodiment, indirect steam cycle 300 may direct steam from the heat exchanger 216 to the compressor 308. In an embodiment, compressor 308 may increase the pressure of the steam to a desired temperature. In an embodiment, the indirect steam cycle 300 may direct steam from the compressor 308 to the peaking heater 220 for additional processing.

While the heat exchanger 216 may be utilized to convert the pressurized cooling water into process steam, and the compressor 308 may be utilized to increase the pressure of the steam, as discussed above in the current disclosure, it is not limited as such. In some examples, one or more heat exchangers in a heat exchanger system may be utilized, alternatively or in addition, to the heat exchanger 216 to convert the pressurized cooling water into process steam. In those or other examples, one or more heat compressors may be utilized, alternatively or in addition, to the compressor 308 to increase the pressure of the steam.

Figure 4:
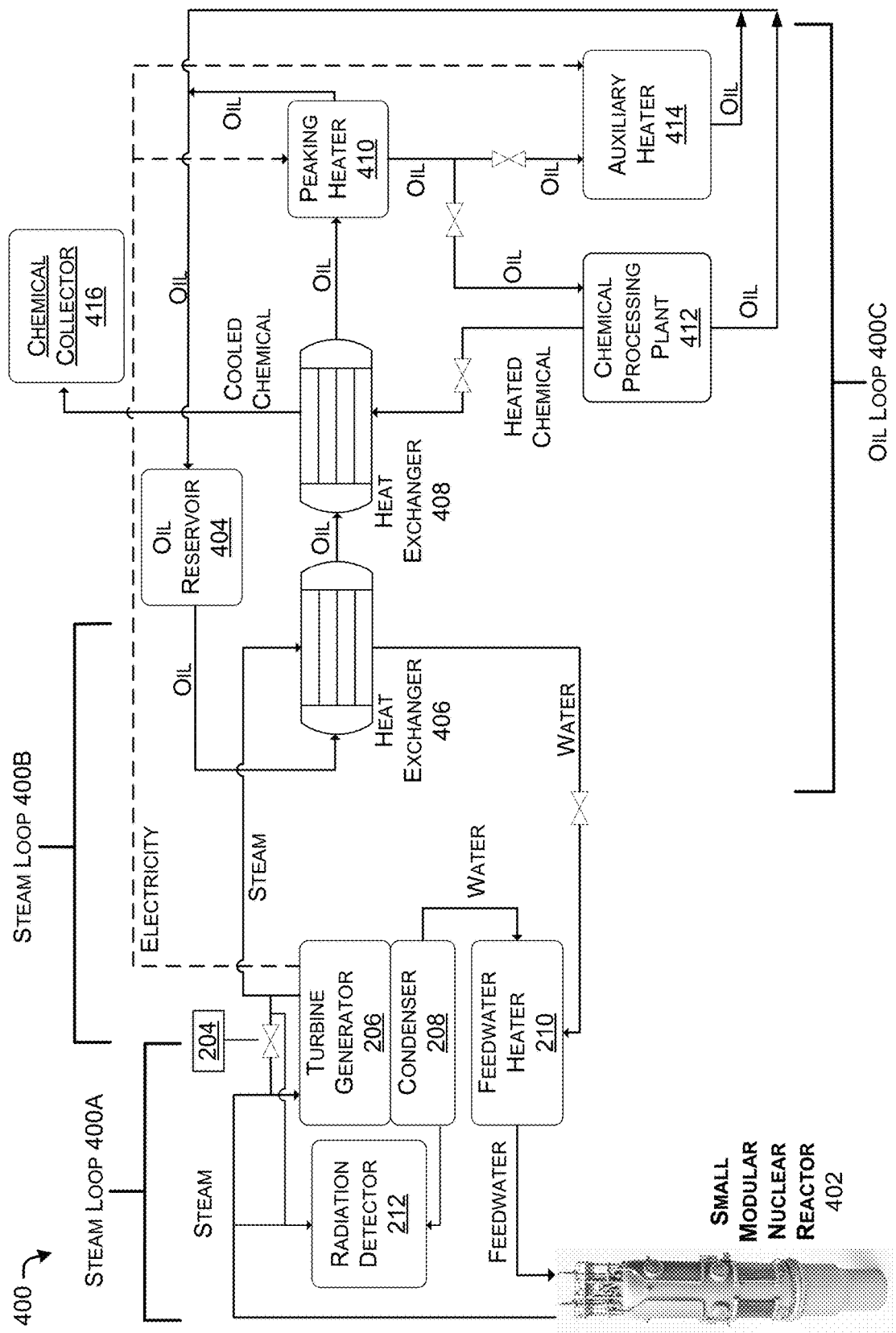
FIG. 4 schematically illustrates an indirect steam cycle receiving steam from a Small Modular Nuclear Reactor (SMR) and utilizing oil as a heat transfer fluid for two heat exchangers.

FIG. 4 schematically illustrates an indirect steam cycle 400 utilizing oil as a heat transfer fluid for two heat exchangers. In various examples, by utilizing oil as a heat transfer fluid, the indirect steam cycle 400 may, in some cases, reduce the potential for contamination or incidental irradiation of the heat transfer fluid.

FIG. 4 may include a steam loop 400A, steam loop 400B, and an oil loop 400C. In an embodiment, oil loop 400C may include oil reservoir 404, heat exchanger 406, heat exchanger 408, peaking heater 410, chemical processing plant 412, auxiliary heater 414, and chemical collector 416.

Steam loop 400A and steam loop 400B may include devices, components, systems, and/or combinations thereof similar to those described above regarding steam loop 200A and 200B, as discussed above with reference to FIG. 2. For example, steam loop 400A may include the radiation detector 212, the turbine generator 206, the condenser 208, and/or the feedwater heater 210, as discussed above with reference to FIG. 2.

In an embodiment the oil loop 400C may transfer heat from high pressure and high-temperature steam into oil in heat exchanger 406 to increase the temperature of the oil such that the oil exiting heat exchanger 406 (i.e., fluid at a third temperature) is at a higher temperature than the oil entering heat exchanger 406 (i.e., fluid at a first temperature). The oil exiting heat exchanger 406 (i.e., fluid at a third temperature) may be directed into heat transfer tubes within heat exchanger 408. Inside heat exchanger 408, the oil (i.e., fluid at a third temperature) may receive more heat from a chemical produced by chemical processing plant 412. The oil may exit heat exchanger 218 at a higher temperature (i.e., fluid at a fourth temperature) than when it entered heat exchanger 218 (i.e., fluid at a third temperature) and be directed to peaking heater 410. Peaking heater 410 may utilize electricity to transfer augmenting heat (i.e., additional supplemental heat to supplement the existing heat) to the oil (e.g., fluid at a fourth temperature) to generate oil at a higher temperature (i.e., fluid at a fifth temperature). It is understood that peaking heater 410 may be configured to provide variable amounts of augmenting heat in order to bring the oil to a specified temperature (i.e., temperatures necessary for a particular petrochemical production process, etc.).

In an embodiment, peaking heater 410 may direct the oil (i.e., fluid at a fifth temperature) to chemical processing plant 412 or auxiliary heater 414. In an embodiment, chemical processing plant 412 may utilize the oil to produce a chemical (i.e., through thermal cracking of alkanes and alkenes, heavy oil conversions to light oil, dissolution of heavy oil to produce gasoline additives, etc.). In an embodiment, the produced chemical may contain excess heat and the heated chemical may be directed to heat exchanger 408 to transfer heat from the heated chemical to the oil passing through the heat transfer tubes to become a cooled chemical. In an embodiment, the resulting cooled chemical may be directed to chemical collector 416. It is understood that chemical collector 416 may be a permanent or temporary system used for chemical storage, chemical delivery, and/or chemical transportation.

In an embodiment, chemical processing plant 412 may discharge the used oil back to oil reservoir 404 for future use. It is understood that oil reservoir 404 may be a storage volume (e.g., permanent tank, portable tank, thermal storage volume, etc.) that may be maintained at a specific temperature.

In an embodiment, peaking heater 410 may utilize electricity to provide augmenting heat to the oil in preparation for additional processing (e.g., bulk plastic waste recycling, light plastics for regeneration of syngas, etc.). In an embodiment, auxiliary heater 414 may be configured to receive oil from the peaking heater 410 (or "fluid at a fifth temperature)". In an embodiment, auxiliary heater 414 may raise the temperature of the oil to a specified temperature (e.g., a temperature necessary for bulk plastic waste recycling, light plastics for regeneration of syngas, etc.). In an embodiment, after increasing the temperature of the oil (i.e., fluid at a sixth temperature), auxiliary heater 414 may direct the oil-to-oil reservoir 404.

Figure 5:
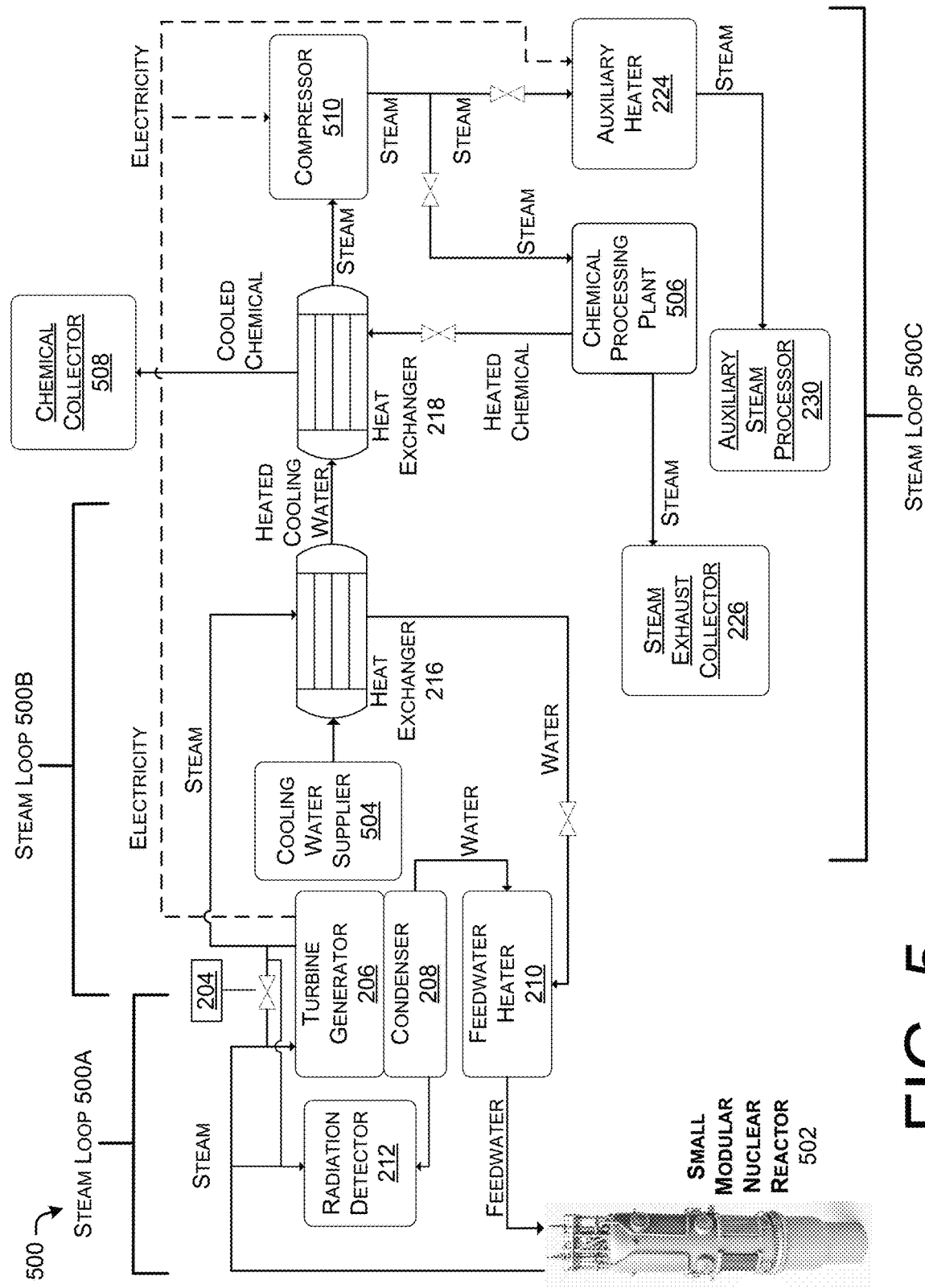
FIG. 5 schematically illustrates an indirect steam cycle receiving steam from a Small Modular Nuclear Reactor (SMR) and utilizing water as a heat transfer fluid for two heat exchangers and a compressor.

FIG. 5 schematically illustrates an indirect steam cycle 500 utilizing water as a heat transfer fluid for two heat exchangers and a compressor. Steam loop 500A, steam loop 500B, and steam loop 500C may include devices similar to those devices described above regarding steam loop 200A, steam loop 200B, and steam loop 200C, as discussed above with reference to FIG. 2.

In an embodiment, steam loop 500C may include cooling water supplier 504, chemical processing plant 506, chemical collector 508, and compressor 510. In contrast to indirect steam cycle 200, as described above with respect to FIG. 2, in an embodiment, the cooling water supplier 504 is not pressurized to a particular specification. It is understood that in an embodiment utilizing compressor 510, the steam being supplied to the chemical processing plant 506 and auxiliary heater 224 may be heated to a desired temperature and pressurized to a desired pressure. In such an embodiment, using compressor 510 will allow for indirect steam cycle 500 to provide process steam at a necessary pressure without requiring the use of pressurized cooling water to heat exchanger 216. In an embodiment, chemical processing plant 506 may be similar to chemical processing plant 222, as described above with reference to FIG. 2. In an embodiment chemical processing plant 506 may be a different process (i.e., a different process necessary for petrochemical production, or a process unrelated to petrochemical production, etc.).

In an embodiment, chemical collector 508 may be similar to or differ from the chemical collector 228 described above with reference to FIG. 2. It is understood that the configuration and operation of chemical collector 508 will depend on the chemical produced by chemical processing plant 506.

In an embodiment, cooling water supplier 504 may be configured to provide cooling water to heat exchanger 216 at any pressure necessary to enable the heat transfer fluid to pass through the components within steam loop 500C. In an embodiment, cooling water may be converted to steam in heat exchanger 218. In an embodiment, compressor 510 may receive steam at a first pressure and may be configured to increase the pressure of the steam to a specific pressure (e.g., a steam pressure necessary to transmit steam throughout steam loop 500C).

In an embodiment the third steam loop 500C may transfer heat from high pressure and high-temperature steam into cooling water in heat exchanger 216 to convert the cooling water into heated cooling water. The heated cooling water may be directed into heat transfer tubes within heat exchanger 218. Inside heat exchanger 218, the heated cooling water may receive more heat from a chemical produced by chemical processing plant 222 to generate process steam. The process steam may exit heat exchanger 218 at a higher temperature than the heated cooling water that entered heat exchanger 218 and be directed to compressor 510. Compressor 510 may utilize electricity to both increase the pressure of the process steam and transfer augmenting heat (i.e., additional supplemental heat to supplement the existing heat) to the process steam. It is understood that compressor 510 may be configured to provide variable amounts of augmenting heat in order to bring the process steam to a specified temperature (i.e., temperatures necessary for a particular petrochemical production process, etc.) and to pressurize the process steam to a specific pressure.

In an embodiment, compressor 510 may direct the process steam to chemical processing plant 506 or auxiliary heater 224. In an embodiment, chemical processing plant 506 may utilize the process steam to produce a chemical (i.e., through thermal cracking of alkanes and alkenes, heavy oil conversions to light oil, dissolution of heavy oil to produce gasoline additives, etc.). In an embodiment, the produced chemical may contain excess heat and the heated chemical may be directed to heat exchanger 218 to transfer heat from the heated chemical to the heated cooling water passing through the heat transfer tubes to become a cooled chemical. In an embodiment, the resulting cooled chemical may be directed to chemical collector 508. It is understood that chemical collector 508 may be a permanent or temporary system used for chemical storage, chemical delivery, and/or chemical transportation.

In an embodiment, chemical processing plant 506 may exhaust the used steam to steam exhaust collector 226 for future use. It is understood that steam exhaust collector 226 may include a connection to an auxiliary system, a connection point to another steam loop, a heat exchanger, or a thermal storage device, etc.

In an embodiment, compressor 510 may utilize electricity to provide pressure and augmenting heat to the process steam in preparation for additional processing (e.g., bulk plastic waste recycling, light plastics for regeneration of syngas, etc.).

FIG. 6 illustrates a flowchart describing an example process 600 for indirectly transferring heat from a small modular nuclear reactor (SMR) to a chemical processing plant and/or auxiliary heater. The order in which the operations or steps are described is not intended to be construed as a limitation, and any number of the described operations may be combined in any order and/or in parallel to implement indirect heat transfer as described herein.

At step 602, the process 600 may include transferring, from a turbine generator (e.g., a turbine generator 206) and to a heat exchanger (e.g., heat exchanger 216), first steam at a first temperature generated utilizing initial steam output by a small modular nuclear reactor (e.g., small modular nuclear reactor 202). For example, a small modular nuclear reactor (e.g., small modular nuclear reactor 202) may generate first steam at a first temperature (e.g., steam exiting the SMR 202) that is directed to a turbine generator (e.g., a turbine generator 206), and the turbine generator may direct second steam at a second temperature (e.g., steam exiting turbine generator 206) to a heat exchanger (e.g., heat exchanger 216). It is understood the first steam may bypass the turbine generator thereby directing the first steam at the first temperature directly to the heat exchanger (i.e., steam exiting SMR 202 may travel through turbine bypass 204 and continue on to heat exchanger 216 without going through turbine generator 206). It is understood that additional heat exchangers (e.g., second heat exchanger, third heat exchanger, etc.) may be utilized to achieve a desired result (i.e., to remove additional heat to increase efficiency).

At step 604, the process 600 may include generating, by the heat exchanger (e.g., heat exchanger 216), second steam emitted from water being heated by the first steam and converted to the second steam (i.e., steam from the SMR 202 may heat water within heat transfer tubes of heat exchanger 216 causing the water within the tubes to convert to steam). For example, a heat exchanger (e.g., heat exchanger 216) may be configured to have water flow through heat transfer tubes and have steam flow across the tubes. With such a heat exchanger (e.g., heat exchanger 216), the second steam at a second temperature may be directed to flow across tubes that are filled with flowing water at a third temperature. The water at the third temperature entering the heat exchanger may be heated by the second steam at a second temperature such that the water is converted to third steam at a fourth temperature. When the second steam transfers heat to the water, the second steam may condense and convert to second water at a fifth temperature that is lower than the second temperature. In the example described above, the second steam at a second temperature has been converted to second water at a fifth temperature lower than the second temperature and the water at a third temperature has been converted into third steam at a fourth temperature, the fourth temperature being higher than the third temperature (i.e., the steam from SMR 202 may be condensed in heat exchanger 216 to become a liquid while pressurized cooling water within the tubes of heat exchanger 216 may be heated by the SMR steam and convert to steam).

At step 606, the process 600 may include directing, by the heat exchanger (e.g., heat exchanger 216), the second steam (e.g., the steam created within heat exchanger 216) to a peaking heater. For example, the third steam at a fourth temperature (i.e., steam generated in a heat exchanger through indirect heat transfer from an SMR) may be directed to a peaking heater.

At step 608, the process 600 may include generating, by the peaking heater (e.g., peaking heater 220), second steam at a second temperature (i.e., steam may enter the peaking heater at a first temperature and peaking heater 220 may generate and transfer augmenting heat to the steam to bring the steam to a higher temperature before the steam exits the peaking heater). For example, the peaking heater may receive the third steam at a fourth temperature and may increase the temperature of the third steam to a fifth temperature. It is understood that the peaking heater may be utilized to increase the third steam to any desired temperature and/or pressure.

At step 610, the process 600 may include directing, by the peaking heater, the second steam at the second temperature to at least one of a chemical processing plant or an auxiliary heater. For example, the peaking heater may receive the third steam discussed in the previous example, increase the temperature to the fourth temperature, as needed, and direct the third steam at the fourth temperature for additional processing. In some instances, a chemical processing plant may require steam at the fourth temperature and the peaking heater may direct the third steam at the fourth temperature to the chemical processing plant. In other instances, the third steam may need to be heated to a fifth temperature that is higher than the fourth temperature for further processing. In those circumstances, the peaking heater may direct the third steam at the fourth temperature to the auxiliary heater so the auxiliary heater may generate third steam at a fifth temperature.

Figure 7:
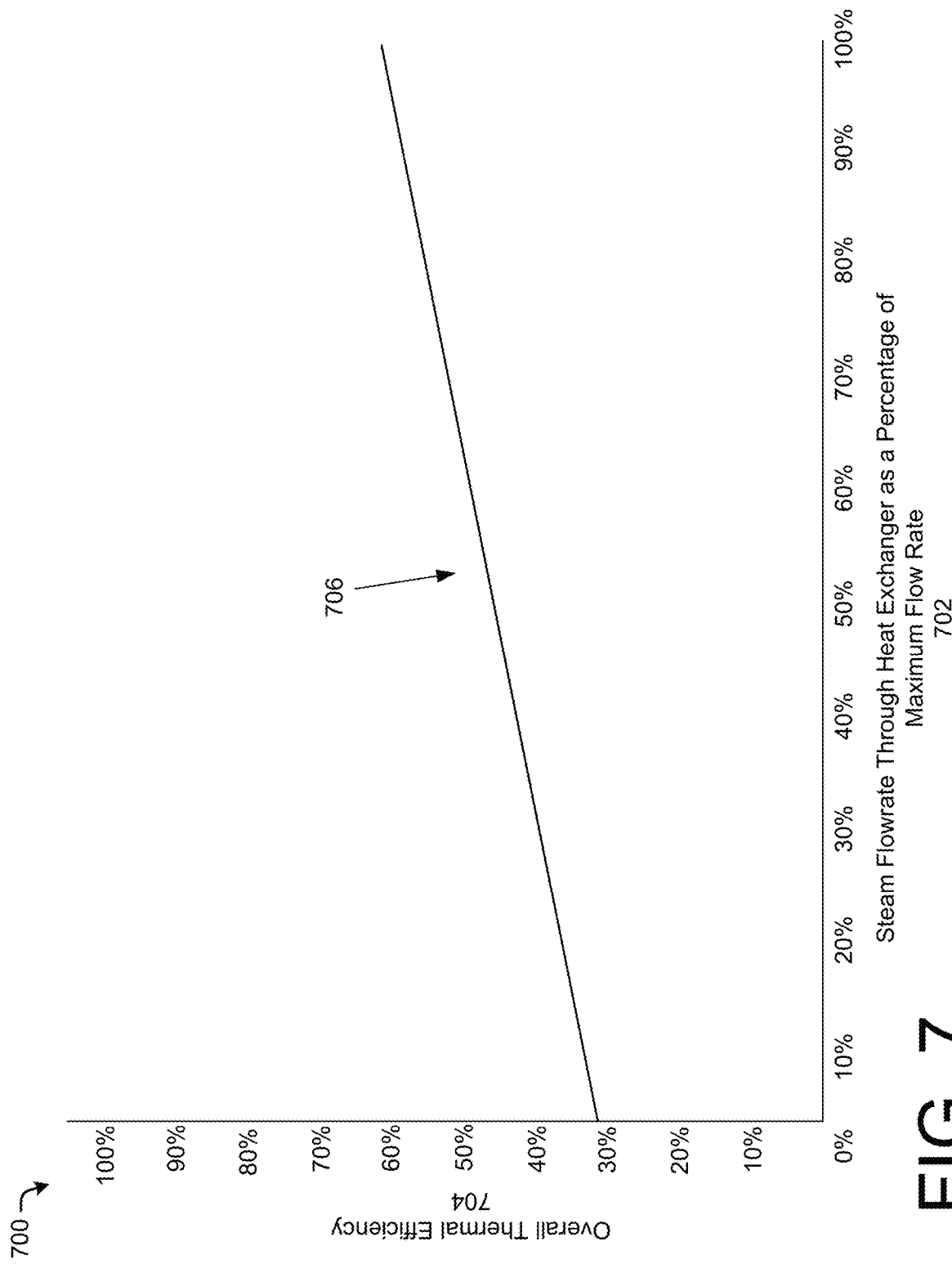
FIG. 7 is a graphical illustration demonstrating the thermal efficacy of adding a second heat exchanger to an indirect steam cycle.

FIG. 7 is a graphical illustration 700 (or "graph 700") demonstrating the thermal efficacy of adding a heat exchanger to an electric-only indirect steam process. For example, the heat exchanger may represent any number of the intermediate heat exchanger(s) 106, as discussed above with reference to FIG. 1. In such an example or another example, the indirect steam process may represent one or more of the indirect steam cycles 200, 300, 400, and 500, as discussed above with reference to FIGS. 2-5.

The percentages along the x-axis 702 may represent the steam flowrate through the heat exchanger as a percentage of maximum flowrate while the percentages along the y-axis 704 may represent overall thermal efficiency.

Graph 700 may include the line 706. Line 706 demonstrates that overall thermal efficacy increases as the flowrate of steam through the heat exchanger increases. More specifically, line 706 demonstrates that overall thermal efficiency increases by approximately 31% by including, as part of the indirect steam process, a heat exchanger with 100% steam flow.

Figure 8:
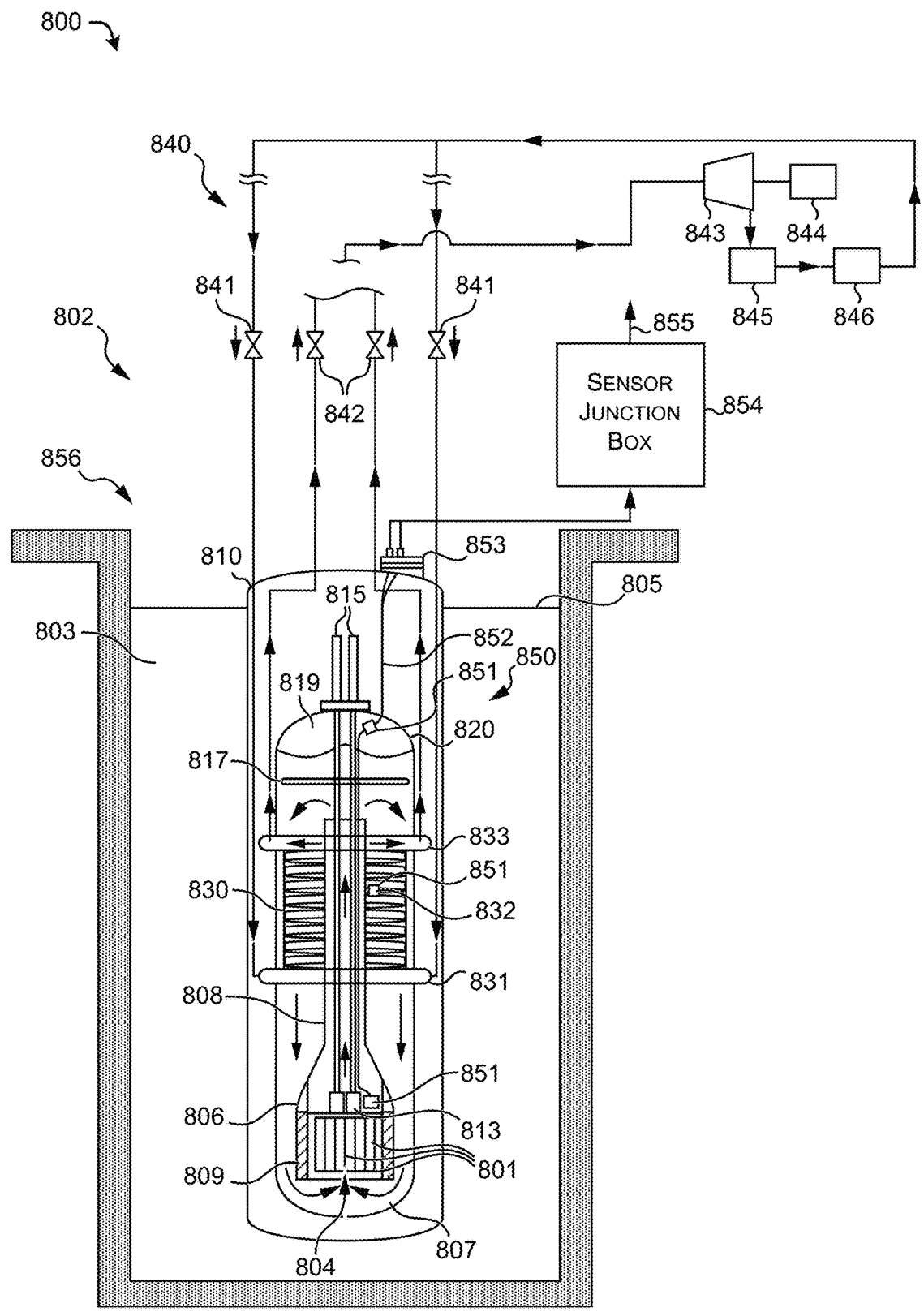
FIG. 8 is a partially schematic, partially cross-sectional view of a nuclear reactor system configured in accordance with embodiments of the present technology.
Figure 9:
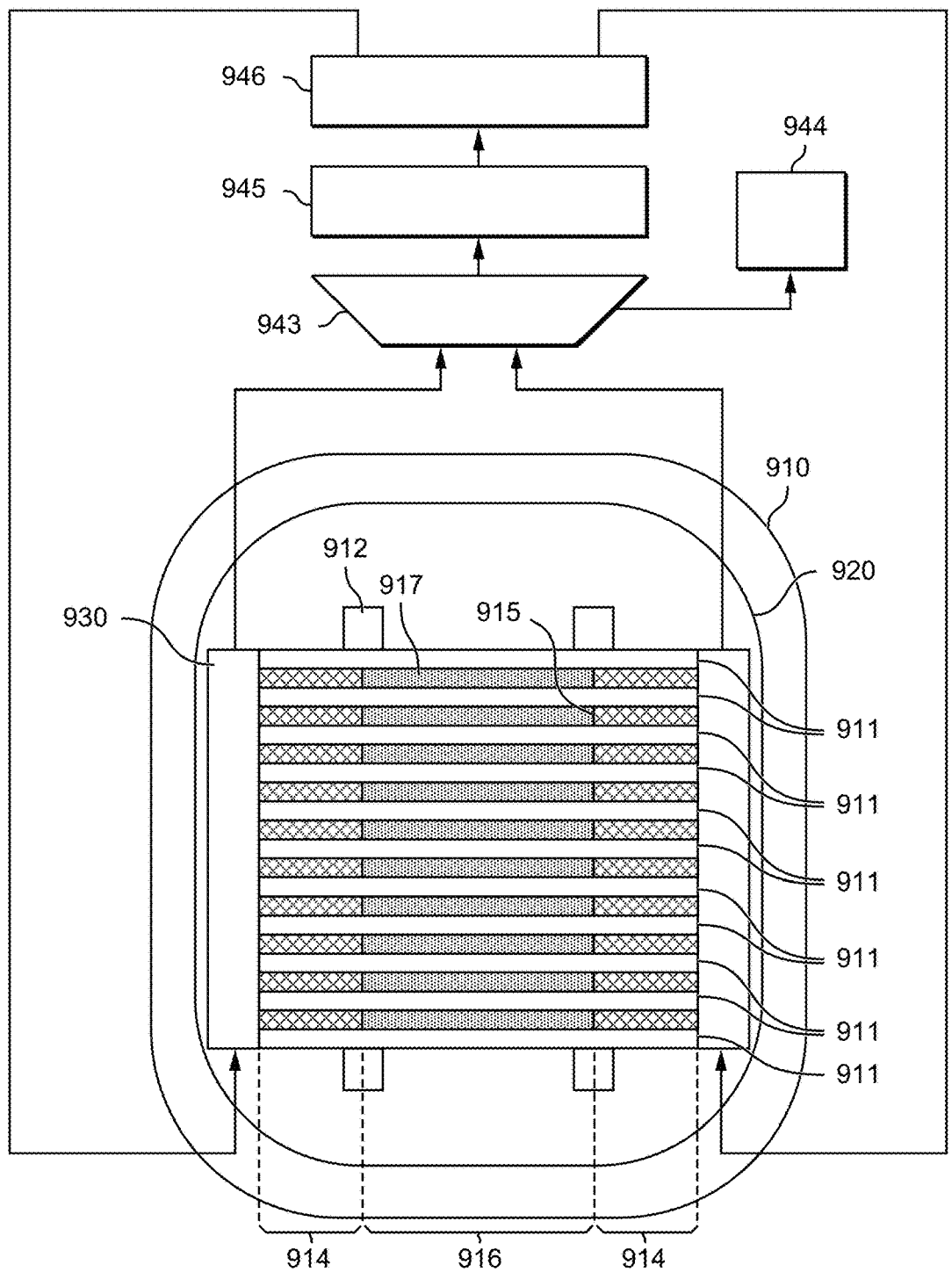
FIG. 9 is a partial schematic, partial cross-sectional view of a nuclear reactor system configured in accordance with additional embodiments of the present technology.

FIGS. 8 and 9 illustrate representative nuclear reactors that may be included in embodiments of the present technology. FIG. 8 is a partially schematic, partially cross-sectional view of a nuclear reactor system 800 configured in accordance with embodiments of the present technology. The system 800 can include a power module 802 having a reactor core 804 in which a controlled nuclear reaction takes place. Accordingly, the reactor core 804 can include one or more fuel assemblies 801. The fuel assemblies 801 can include fissile and/or other suitable materials. Heat from the reaction generates steam at a steam generator 830, which directs the steam to a power conversion system 840. The power conversion system 840 generates electrical power, and/or provides other useful outputs, such as super-heated steam. A sensor system 850 is used to monitor the operation of the power module 802 and/or other system components. The data obtained from the sensor system 850 can be used in real time to control the power module 802, and/or can be used to update the design of the power module 802 and/or other system components.

The power module 802 includes a containment vessel 810 (e.g., a radiation shield vessel, or a radiation shield container) that houses/encloses a reactor vessel 820 (e.g., a reactor pressure vessel, or a reactor pressure container), which in turn houses the reactor core 804. The containment vessel 810 can be housed in a power module bay 856. The power module bay 856 can contain a cooling pool 803 filled with water and/or another suitable cooling liquid. The bulk of the power module 802 can be positioned below a surface 805 of the cooling pool 803. Accordingly, the cooling pool 803 can operate as a thermal sink, for example, in the event of a system malfunction.

A volume between the reactor vessel 820 and the containment vessel 810 can be partially or completely evacuated to reduce heat transfer from the reactor vessel 820 to the surrounding environment (e.g., to the cooling pool 803). However, in other embodiments the volume between the reactor vessel 820 and the containment vessel 810 can be at least partially filled with a gas and/or a liquid that increases heat transfer between the reactor vessel 820 and the containment vessel 810. For example, the volume between the reactor vessel 820 and the containment vessel 810 can be at least partially filled (e.g., flooded with the primary coolant 807) during an emergency operation.

Within the reactor vessel 820, a primary coolant 807 conveys heat from the reactor core 804 to the steam generator 830. For example, as illustrated by arrows located within the reactor vessel 820, the primary coolant 807 is heated at the reactor core 804 toward the bottom of the reactor vessel 820. The heated primary coolant 807 (e.g., water with or without additives) rises from the reactor core 804 through a core shroud 806 and to a riser tube 808. The hot, buoyant primary coolant 807 continues to rise through the riser tube 808, then exits the riser tube 808 and passes downwardly through the steam generator 830. The steam generator 830 includes a multitude of conduits 832 that are arranged circumferentially around the riser tube 808, for example, in a helical pattern, as is shown schematically in FIG. 8. The descending primary coolant 807 transfers heat to a secondary coolant (e.g., water) within the conduits 832, and descends to the bottom of the reactor vessel 820 where the cycle begins again. The cycle can be driven by the changes in the buoyancy of the primary coolant 807, thus reducing or eliminating the need for pumps to move the primary coolant 807.

The steam generator 830 can include a feedwater header 831 at which the incoming secondary coolant enters the steam generator conduits 832. The secondary coolant rises through the conduits 832, converts to vapor (e.g., steam), and is collected at a steam header 833. The steam exits the steam header 833 and is directed to the power conversion system 840.

The power conversion system 840 can include one or more steam valves 842 that regulate the passage of high pressure, high temperature steam from the steam generator 830 to a steam turbine 843. The steam turbine 843 converts the thermal energy of the steam to electricity via a generator 844. The low-pressure steam exiting the turbine 843 is condensed at a condenser 845, and then directed (e.g., via a pump 846) to one or more feedwater valves 241. The feedwater valves 841 control the rate at which the feedwater re-enters the steam generator 830 via the feedwater header 831. In other embodiments, the steam from the steam generator 830 can be routed for direct use in an industrial process, such as a Hydrogen ($H_2$) and Oxygen ($O_2$) production plant, a chemical production plant, and/or the like, as described in detail below. Accordingly, steam exiting the steam generator 830 can bypass the power conversion system 840.

The power module 802 includes multiple control systems and associated sensors. For example, the power module 802 can include a hollow cylindrical reflector 809 that directs neutrons back into the reactor core 804 to further the nuclear reaction taking place therein. Control rods 813 are used to modulate the nuclear reaction and are driven via fuel rod drivers 815. The pressure within the reactor vessel 820 can be controlled via a pressurizer plate 817 (which can also serve to direct the primary coolant 807 downwardly through the steam generator 830) by controlling the pressure in a pressurizing volume 819 positioned above the pressurizer plate 817.

The sensor system 850 can include one or more sensors 851 positioned at a variety of locations within the power module 802 and/or elsewhere, for example, to identify operating parameter values and/or changes in parameter values. The data collected by the sensor system 850 can then be used to control the operation of the system 800, and/or to generate design changes for the system 800. For sensors positioned within the containment vessel 810, a sensor link 852 directs data from the sensors to a flange 853 (at which the sensor link 852 exits the containment vessel 810) and directs data to a sensor junction box 854. From there, the sensor data can be routed to one or more controllers and/or other data systems via a data bus 855.

FIG. 9 is a partially schematic, partially cross-sectional view of a nuclear reactor system 900 configured in accordance with additional embodiments of the present technology. In some embodiments, the nuclear reactor system 900 ("system 900") can include some features that are at least generally similar in structure and function, or identical in structure and function, to the corresponding features of the system 900 described in detail above with reference to FIG. 9 and can operate in a generally similar or identical manner to the system 900.

In the illustrated embodiment, the system 900 includes a reactor vessel 920 and a containment vessel 910 surrounding/enclosing the reactor vessel 920. In some embodiments, the reactor vessel 920 and the containment vessel 910 can be roughly cylinder-shaped or capsule-shaped. The system 900 further includes a plurality of heat pipe layers 911 within the reactor vessel 920. In the illustrated embodiment, the heat pipe layers 911 are spaced apart from and stacked over one another. In some embodiments, the heat pipe layers 911 can be mounted/secured to a common frame 912, a portion of the reactor vessel 920 (e.g., a wall thereof), and/or other suitable structures within the reactor vessel 920. In other embodiments, the heat pipe layers 911 can be directly stacked on top of one another such that each of the heat pipe layers 911 supports and/or is supported by one or more of the other ones of the heat pipe layers 911.

In the illustrated embodiment, the system 900 further includes a shield or reflector region 914 at least partially surrounding a core region 916. The heat pipe layers 911 can be circular, rectilinear, polygonal, and/or can have other shapes, such that the core region 916 has a corresponding three-dimensional shape (e.g., cylindrical, spherical). In some embodiments, the core region 916 is separated from the reflector region 914 by a core barrier 915, such as a metal wall. The core region 916 can include one or more fuel sources, such as fissile material, for heating the heat pipe layers 911. The reflector region 914 can include one or more materials configured to contain/reflect products generated by burning the fuel in the core region 916 during operation of the system 900. For example, the reflector region 914 can include a liquid or solid material configured to reflect neutrons and/or other fission products radially inward toward the core region 916. In some embodiments, the reflector region 914 can entirely surround the core region 916. In other embodiments, the reflector region 914 may partially surround the core region 916. In some embodiments, the core region 916 can include a control material 917, such as a moderator and/or coolant. The control material 917 can at least partially surround the heat pipe layers 911 in the core region 916 and can transfer heat therebetween.

In the illustrated embodiment, the system 900 further includes at least one heat exchanger 930 (e.g., a steam generator) positioned around the heat pipe layers 911. The heat pipe layers 911 can extend from the core region 916 and at least partially into the reflector region 914 and are thermally coupled to the heat exchanger 930. In some embodiments, the heat exchanger 930 can be positioned outside of or partially within the reflector region 914. The heat pipe layers 911 provide a heat transfer path from the core region 916 to the heat exchanger 930. For example, the heat pipe layers 911 can each include an array of heat pipes that provide a heat transfer path from the core region 916 to the heat exchanger 930. When the system 900 operates, the fuel in the core region 916 can heat and vaporize a fluid within the heat pipes in the heat pipe layers 911, and the fluid can carry the heat to the heat exchanger 930. The heat pipes in the heat pipe layers 911 can then return the fluid toward the core region 916 via wicking, gravity, and/or other means to be heated and vaporized once again.

In some embodiments, the heat exchanger 930 can be similar to the steam generator 830 of FIG. 8 and, for example, can include one or more helically-coiled tubes that wrap around the heat pipe layers 911. The tubes of the heat exchanger 930 can include or carry a working fluid (e.g., a coolant such as water or another fluid) that carries the heat from the heat pipe layers 911 out of the reactor vessel 920 and the containment vessel 910 for use in generating electricity, steam, and/or the like. For example, in the illustrated embodiment the heat exchanger 930 is operably coupled to a turbine 943, a generator 944, a condenser 945, and a pump 946. As the working fluid within the heat exchanger 930 increases in temperature, the working fluid may begin to boil and vaporize. The vaporized working fluid (e.g., steam) may be used to drive the turbine 943 to convert the thermal potential energy of the working fluid into electrical energy via the generator 944. The condenser 945 can condense the working fluid after it passes through the turbine 943, and the pump 946 can direct the working fluid back to the heat exchanger 930 where it can begin another thermal cycle. In other embodiments, steam from the heat exchanger 930 can be routed for direct use in an industrial process, such as an enhanced oil recovery operation described in detail below. Accordingly, steam exiting the heat exchanger 930 can bypass the turbine 943, the generator 944, the condenser 945, the pump 946, etc.

Figure 10:
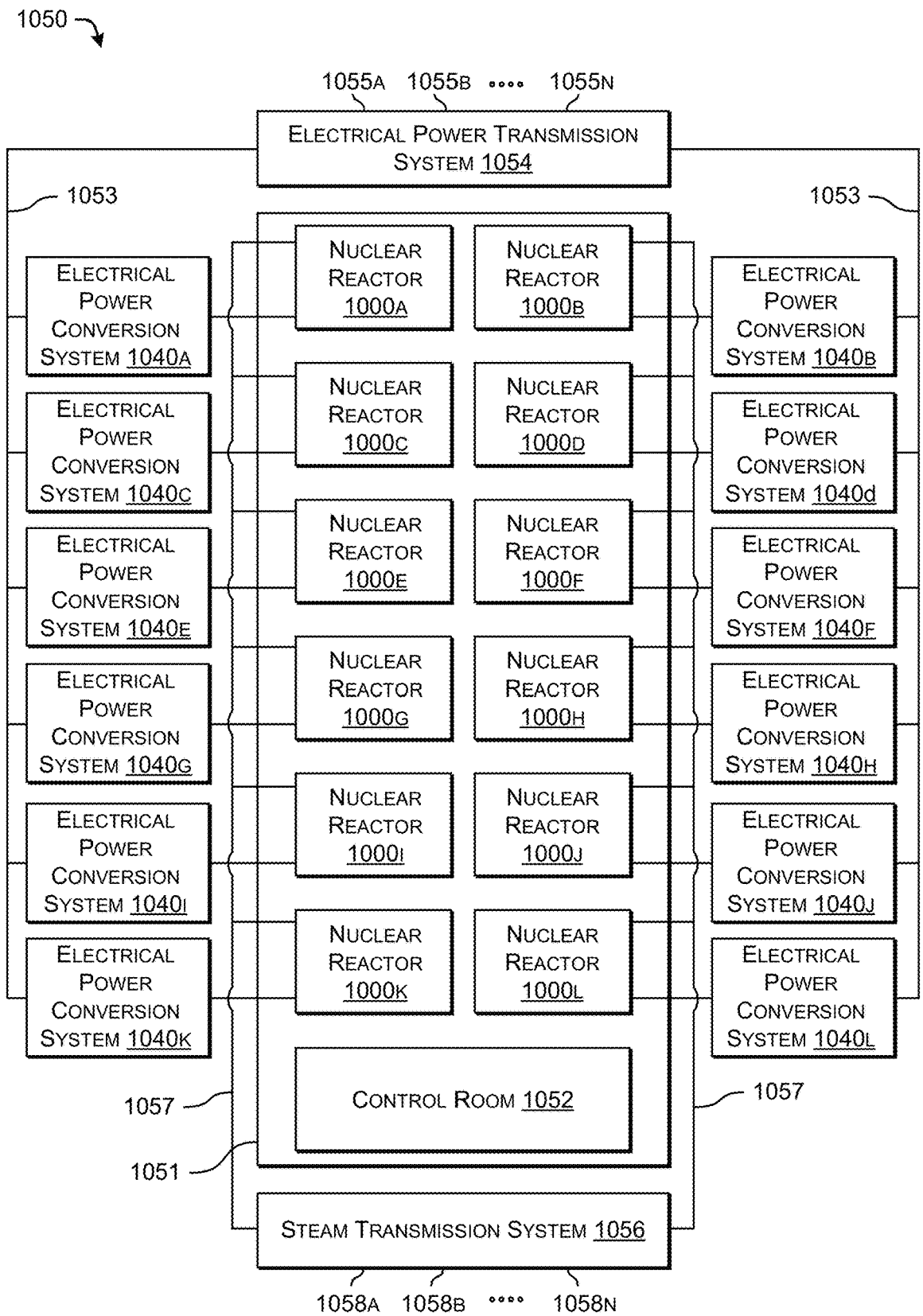
FIG. 10 is a schematic view of a nuclear power plant system including multiple nuclear reactors in accordance with embodiments of the present technology.

FIG. 10 is a schematic view of a nuclear power plant system 1050 including multiple nuclear reactors 1000 in accordance with embodiments of the present technology. Each of the nuclear reactors 1000 (individually identified as first through twelfth nuclear reactors 1000a-1, respectively) can be similar to or identical to the nuclear reactor 1000 and/or the nuclear reactor 1000 described in detail above with reference to FIGS. 8 and 10. The power plant system 1050 ("power plant system 1050") can be "modular" in that each of the nuclear reactors 1000 can be operated separately to provide an output, such as electricity or steam. The power plant system 1050 can include fewer than twelve of the nuclear reactors 1000 (e.g., two, three, four, five, six, seven, eight, nine, ten, or eleven of the nuclear reactors 1000), or more than twelve of the nuclear reactors 1000. The power plant system 1050 can be a permanent installation or can be mobile (e.g., mounted on a truck, tractor, mobile platform, and/or the like). In the illustrated embodiment, each of the nuclear reactors 1000 can be positioned within a common housing 1051, such as a reactor plant building, and controlled and/or monitored via a control room 1052.

Each of the nuclear reactors 1000 can be coupled to a corresponding electrical power conversion system 1040 (individually identified as first through twelfth electrical power conversion systems 1040a-1, respectively). The electrical power conversion systems 1040 can include one or more devices that generate electrical power or some other form of usable power from steam generated by the nuclear reactors 1000. In some embodiments, multiple ones of the nuclear reactors 1000 can be coupled to the same one of the electrical power conversion systems 1040 and/or one or more of the nuclear reactors 1000 can be coupled to multiple ones of the electrical power conversion systems 1040 such that there is not a one-to-one correspondence between the nuclear reactors 1000 and the electrical power conversion systems 1040.

The electrical power conversion systems 1040 can be further coupled to an electrical power transmission system 1054 via, for example, an electrical power bus 1053. The electrical power transmission system 1054 and/or the electrical power bus 1053 can include one or more transmission lines, transformers, and/or the like for regulating the current, voltage, and/or other characteristic(s) of the electricity generated by the electrical power conversion systems 1040. The electrical power transmission system 1054 can route electricity via a plurality of electrical output paths 1055 (individually identified as electrical output paths 1055a-n) to one or more end users and/or end uses, such as different electrical loads of an integrated energy system.

Each of the nuclear reactors 1000 can further be coupled to a steam transmission system 1056 via, for example, a steam bus 1057. The steam bus 1057 can route steam generated from the nuclear reactors 1000 to the steam transmission system 1056 which in turn can route the steam via a plurality of steam output paths 1058 (individually identified as steam output paths 1058a-n) to one or more end users and/or end uses, such as different steam inputs of an integrated energy system.

In some embodiments, the nuclear reactors 1000 can be individually controlled (e.g., via the control room 1052) to provide steam to the steam transmission system 1056 and/or steam to the corresponding one of the electrical power conversion systems 1040 to provide electricity to the electrical power transmission system 1054. In some embodiments, the nuclear reactors 1000 are configured to provide steam either to the steam bus 1057 or to the corresponding one of the electrical power conversion systems 1040 and can be rapidly and efficiently switched between providing steam to either. Accordingly, in some aspects of the present technology the nuclear reactors 1000 can be modularly and flexibly controlled such that the power plant system 1050 can provide differing levels/amounts of electricity via the electrical power transmission system 1054 and/or steam via the steam transmission system 1056. For example, where the power plant system 1050 is used to provide electricity and steam to one or more industrial process-such as various components of the integrated energy systems, the nuclear reactors 1000 can be controlled to meet the differing electricity and steam requirements of the industrial processes.

As one example, during a first operational state of an integrated energy system employing the power plant system 1050, a first subset of the nuclear reactors 1000 (e.g., the first through sixth nuclear reactors 1000a-f) can be configured to provide steam to the steam transmission system 1056 for use in the first operational state of the integrated energy system, while a second subset of the nuclear reactors 1000 (e.g., the seventh through twelfth nuclear reactors 1000g-1) can be configured to provide steam to the corresponding ones of the electrical power conversion systems 1040 (e.g., the seventh through twelfth electrical power conversion systems 1040g-1) to generate electricity for the first operational state of the integrated energy system. Then, during a second operational state of the integrated energy system when a different (e.g., greater or lesser) amount of steam and/or electricity is required, some or all the first subset of the nuclear reactors 1000 can be switched to provide steam to the corresponding ones of the electrical power conversion systems 1040 (e.g., the seventh through twelfth electrical power conversion systems 1040g-1) and/or some or all of the second subset of the nuclear reactors 1000 can be switched to provide steam to the steam transmission system 1056 to vary the amount of steam and electricity produced to match the requirements/demands of the second operational state. Other variations of steam and electricity generation are possible based on the needs of the integrated energy system. That is, the nuclear reactors 1000 can be dynamically/flexibly controlled during other operational states of an integrated energy system to meet the steam and electricity requirements of the operational state.

In contrast, some conventional nuclear power plant systems can typically generate either steam or electricity for output and cannot be modularly controlled to provide varying levels of steam and electricity for output. Moreover, it is typically difficult (e.g., expensive, time consuming, etc.) to switch between steam generation and electricity generation in conventional nuclear power plant systems. Specifically, for example, it is typically extremely time consuming to switch between steam generation and electricity generation in prototypical large nuclear power plant systems.

The nuclear reactors 1000 can be individually controlled via one or more operators and/or via a computer system. Accordingly, many embodiments of the technology described herein may take the form of computer- or machine- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller or data processor that is specifically programmed, configured, or constructed to perform one or more of the computer-executable instructions described below. Accordingly, the terms "computer" and "controller" as generally used herein refer to any data processor and can include Internet appliances and hand-held devices (including palmtop computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An integrated system for indirect cycle steam heating, the integrated system comprising:
   a nuclear power module configured to output initial steam;
   a turbine generator configured to receive the initial steam and output first steam;
   at least one heat exchanger configured to:
      receive water,
      receive at least one of:
         the initial steam via a turbine bypass, and
         first steam, and
      transfer heat from the at least one of the initial steam and the first steam into the water to create second steam;
   a peaking heater configured to:
      receive the second steam,
      transfer augmenting heat into the second steam, and
      convert, based at least in part on the transferring of the augmenting heat, the second steam to a third steam with a temperature above a threshold temperature;
   a recipient configured to receive the third steam, the recipient comprising an auxiliary heater or a chemical processing plant.

2. The integrated system of claim 1, the at least one heat exchanger comprising a first heat exchanger and a second heat exchanger, the first heat exchanger being configured to transfer heat from the second steam into the water to create altered second steam,
   further comprising:
   the second heat exchanger configured to transfer heat from a chemical into the altered second steam to produce the third steam,
   wherein the peaking heater is further configured to:
      receive, from the second heat exchanger, the third steam,
      generate the augmenting heat,
      transfer the augmenting heat into the third steam to generate fourth steam to have a temperature above a second threshold temperature, in response to the receiving of the third steam from the second heat exchanger, and,
   wherein the auxiliary heater is further configured to receive the fourth steam, and
   wherein the chemical processing plant is further configured to receive the fourth steam and transfer heat from the fourth steam into the chemical.

3. The integrated system of claim 1, further comprising:
   a petrochemical plant, comprising:
      the peaking heater; and
      the auxiliary heater or the chemical processing plant, the petrochemical plant being located within a distance from a nuclear emergency planning zone, the distance being less than a threshold distance, the petrochemical plant being located at a distance from the nuclear power module that is less than a predetermined distance,
   wherein the nuclear power module, the turbine generator; and the heat exchanger are located in the nuclear emergency planning zone;
   wherein the petrochemical plant and the nuclear emergency planning zone are within a number of miles from each other that is less than a predetermined number of miles.

4. The integrated system of claim 1, further comprising a turbine bypass configured to divert the first steam to the heat exchanger.

5. The integrated system of claim 1, further comprising a water pump coupled to the heat exchanger via one or more pipes, wherein the water pump is configured to pressurize the water to have a pressure above a threshold pressure.

6. The integrated system of claim 1, the nuclear power module being a first nuclear power module, the recipient comprising the auxiliary heater;
   further comprising:
   a second nuclear power module configured to provide electricity to the peaking heater and the auxiliary heater.

7. The integrated system of claim 1, the nuclear power module being a first nuclear power module, further comprising:
a second nuclear power module configured to provide fourth steam to the heat exchanger, the fourth steam having similar characteristics of the first steam.

8. A system comprising:
a turbine generator configured to output first steam;
a first heat exchanger configured to:
   receive a fluid at a first temperature,
   receive the first steam from the turbine generator, the first steam having a second temperature generated utilizing initial steam output by a nuclear power module,
   output the fluid at a third temperature that is greater than the first temperature, and
a second heat exchanger configured to:
   heat the fluid to a fourth temperature that is greater than the first temperature,
   direct the fluid at the fourth temperature to a peaking heater,
the peaking heater configured to:
   heat the fluid to a fifth temperature, and
   direct the fluid at the fifth temperature to at least one of:
      a chemical processing plant; or
      an auxiliary heater.

9. The system of claim 8, further comprising:
a petrochemical plant, comprising:
   the peaking heater,
   the auxiliary heater configured to receive third steam, and
   the chemical processing plant;
a nuclear emergency planning zone located within a distance from a petrochemical plant, the distance being less than a predetermined distance, the nuclear emergency planning zone comprising:
   the turbine generator,
   the first heat exchanger, and
   the second heat exchanger.

10. The system of claim 8, further comprising:
a turbine generator bypass configured to route the first steam from the turbine generator to the first heat exchanger.

11. The system of claim 8, wherein the second heat exchanger is further configured to pressurize the fluid at the third temperature to a pressure that is greater than a predetermine pressure.

12. The system of claim 8, further comprising a radiation monitoring system configured to monitor the first steam for radioactive material.

13. The system of claim 8, wherein the auxiliary heater is configured to receive the fluid supplied by the peaking heater at a fifth temperature and generate fluid at a sixth temperature.

14. The system of claim 8, wherein the fluid supplied to the at least one of the chemical processing plant or the auxiliary heater is converted, by the at least one of the chemical processing plant or the auxiliary heater, to the first temperature, and
wherein the fluid converted from the fifth temperature to the first temperature is directed to the first heat exchanger.

15. The system of claim 8, wherein the fluid is water.

16. A method comprising:
transferring, from a turbine generator and to at least one heat exchanger, first steam at a first temperature generated utilizing initial steam output by a small modular nuclear reactor;
generating, within the at least one heat exchanger, second steam from water being heated by the first steam;
directing, by the at least one heat exchanger, the second steam to a peaking heater;
generating, by the peaking heater based on the second steam, third steam at a second temperature; and
directing, by the peaking heater, the third steam to at least one of a chemical processing plant or an auxiliary heater.

17. The method of claim 16, further comprising:
receiving, by a petrochemical plant, the third steam, the petrochemical plant comprising the auxiliary heater, the petrochemical plant being located at an area at a distance from a nuclear emergency planning zone associated with the nuclear power model, the distance being less than a threshold distance.

18. The method of claim 16, further comprising:
pressurizing, by a pump, the water to have a pressure above a threshold pressure.

19. The method of claim 16, the at least one heat exchanger comprising a first heat exchanger and a second heat exchanger, further comprising:
converting, by the first heat exchanger, the first steam into altered first steam to generate water based on heat being released from the first steam;
transferring, by a second heat exchanger, heat from a chemical into the altered first steam to produce second steam;
delivering, by the second heat exchanger and to the peaking heater, the second steam;
transferring augmenting heat into the second steam to produce third steam reaching a temperature above a threshold temperature;
receiving, by chemical processing plant, the third steam; and
transferring heat from the third steam into the chemical.

20. The method of claim 16, further comprising:
converting, by the first heat exchanger, the first steam into altered first steam;
directing, by the chemical processing plant, a chemical to the second heat exchanger; and
transferring, by the second heat exchanger, heat from the chemical into the altered first steam to produce the second steam.

* * * * *